(12) United States Patent
Namba et al.

(10) Patent No.: US 9,036,490 B2
(45) Date of Patent: May 19, 2015

(54) RADIO RELAY APPARATUS AND CONTROL METHOD

(75) Inventors: Akira Namba, Inagi (JP); Yoshitsugu Hirata, Osaka (JP)

(73) Assignee: KYOCERA Corporation, Kyoto (JP)

( * ) Notice: Subject to any disclaimer, the term of this patent is extended or adjusted under 35 U.S.C. 154(b) by 194 days.

(21) Appl. No.: 13/807,845

(22) PCT Filed: Jul. 1, 2011

(86) PCT No.: PCT/JP2011/065216
§ 371 (c)(1),
(2), (4) Date: Dec. 31, 2012

(87) PCT Pub. No.: WO2012/002543
PCT Pub. Date: Jan. 5, 2012

(65) Prior Publication Data
US 2013/0100826 A1    Apr. 25, 2013

(30) Foreign Application Priority Data

Jul. 1, 2010   (JP) .................................. 2010-151486

(51) Int. Cl.
*H04W 24/02*    (2009.01)
*H04W 56/00*    (2009.01)
*H04B 7/155*    (2006.01)
*H04W 84/04*    (2009.01)
*H04W 92/10*    (2009.01)

(52) U.S. Cl.
CPC ............... *H04W 24/02* (2013.01); *H04B 7/155* (2013.01); *H04W 56/0015* (2013.01); *H04W 84/047* (2013.01); *H04W 92/10* (2013.01)

(58) Field of Classification Search
CPC ................................................ H04W 56/0015
USPC .................................................. 370/246, 315
See application file for complete search history.

(56) References Cited

FOREIGN PATENT DOCUMENTS

| JP | 10-065601 | 3/1998 |
| JP | 2002-111571 A | 4/2002 |
| JP | 2010-056711 A | 3/2010 |

OTHER PUBLICATIONS

International Search Report; PCT/JP2011/065216; Sep. 6, 2011.

*Primary Examiner* — Dang Ton
*Assistant Examiner* — Kevin Lee
(74) *Attorney, Agent, or Firm* — Studebaker & Brackett PC

(57) ABSTRACT

A radio relay apparatus 100 used in a radio communication system in which a radio base station 200 transmits abase station preamble signal at a predetermined timing includes a control unit 130 that controls a service-side radio communication unit 120S that performs radio communication with the radio terminal, the base station preamble signal being a radio signal to be used by a radio terminal to establish synchronization. The service-side radio communication unit 120S transmits a relay station preamble signal at a timing different from the predetermined timing, the relay station preamble signal being a radio signal to be used by the radio terminal to establish synchronization. The control unit 130 controls the service-side radio communication unit 120S so that at the predetermined timing, the service-side radio communication unit 120S transmits a preamble mask signal that is a radio signal to disturb the base station preamble signal.

9 Claims, 7 Drawing Sheets

FIG. 6
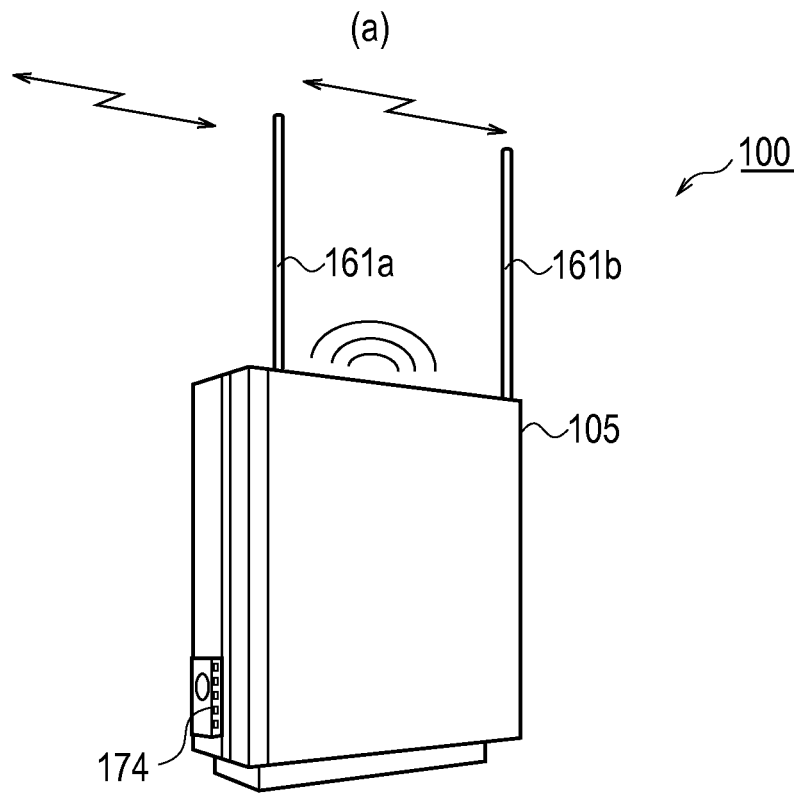
(a)
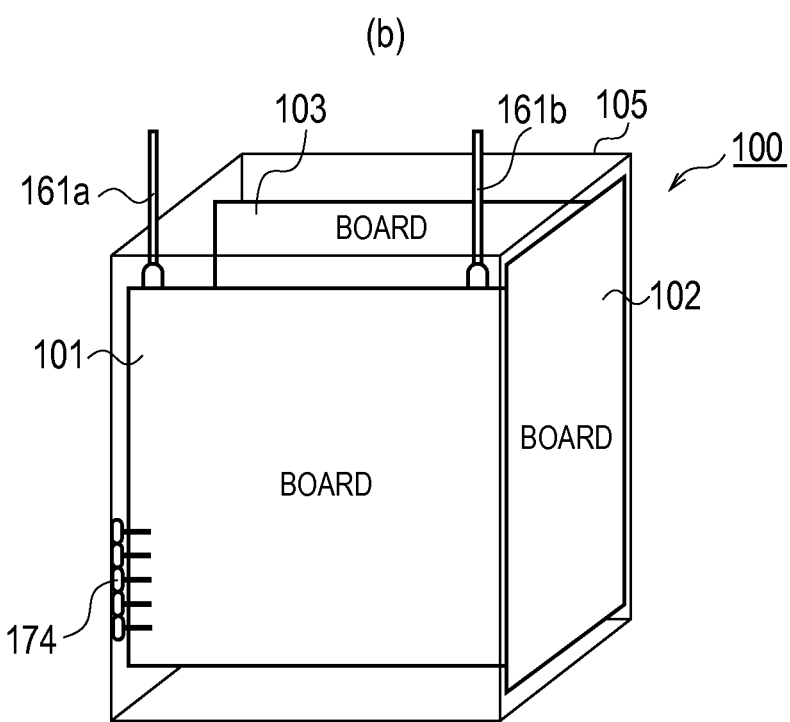
(b)

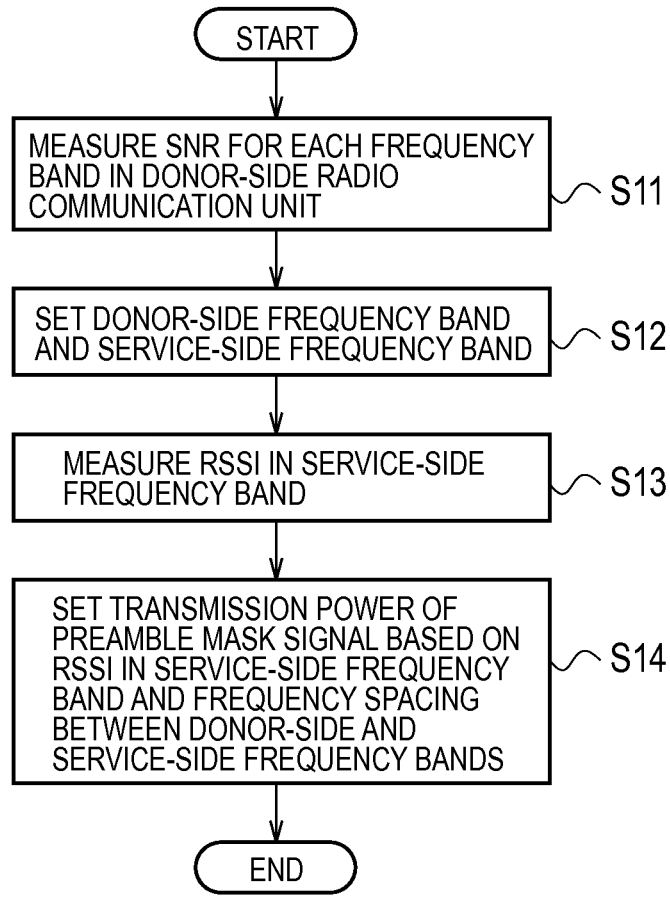

RADIO RELAY APPARATUS AND CONTROL METHOD

TECHNICAL FIELD

The present invention relates to a radio relay apparatus and a control method that relay data exchanged between a radio base station and a radio terminal.

BACKGROUND ART

A radio relay apparatus has heretofore been widely used which relays data exchanged between a radio base station and a radio terminal. Such a radio terminal can communicate with the radio base station through the radio relay apparatus even if the radio terminal is located outside a cell (communication area) formed by the radio base station, or located in a peripheral portion of the cell (so-called a cell fringe).

Such a radio relay apparatus includes a first radio communication unit configured to perform radio communications with the radio base station, a second radio communication unit configured to perform radio communications with the radio terminal, and a control unit configured to control the first radio communication unit and the second radio communication unit.

Further, a time division duplexing (TDD) scheme is known as a scheme for achieving bidirectional communication in a radio communication system. According to the TDD scheme, each of communication frames includes, in a time-divided manner, a downlink period for transmitting data from the radio base station to the radio terminal and an uplink period for transmitting data from the radio terminal to the radio base station.

In the case of using the radio relay apparatus in a radio communication system employing the TDD scheme, in the downlink period, the first radio communication unit receives a radio signal from the radio base station and, at the same time, the second radio communication unit transmits a radio signal to the radio terminal. For this reason, the radio signal transmitted by the second radio communication unit interferes with the first radio communication unit. Likewise, in the uplink period, the second radio communication unit receives a radio signal from the radio terminal and, at the same time, the first radio communication unit transmits a radio signal to the radio base station. For this reason, the radio signal transmitted by the first radio communication unit interferes with the second radio communication unit.

To solve such a problem, there has been proposed a radio relay apparatus configured so that the period during which the second radio communication unit transmits the radio signal to the radio terminal is shifted from the downlink period to the uplink period and the period during which the second radio communication unit receives the radio signal from the radio terminal is shifted from the uplink period to the downlink period (see Patent Document 1).

The radio base station and the second radio communication unit of the radio relay apparatus transmit synchronization signals at predetermined timing in the downlink period, the synchronization signals being radio signals used by the radio terminal to establish synchronization. The radio terminal searches for the synchronization signal when starting radio communication, and establishes synchronization with the source of the synchronization signal when having received the synchronization signal successfully, thereby connecting to the source of the synchronization signal.

However, the radio relay apparatus described in Patent Document 1 shifts the period for transmitting the radio signal to the radio terminal to the uplink period. Therefore, the radio terminal located near the radio relay apparatus receives the synchronization signal (hereinafter referred to as the first synchronization signal) from the radio base station and the synchronization signal (hereinafter referred to as the second synchronization signal) from the radio relay apparatus at different timings.

The radio terminal located near the radio relay apparatus can perform radio communication in good communication conditions by connecting to the radio relay apparatus. However, when receiving the first and second synchronization signals at different timings, the radio terminal may be connected to the radio base station or may fail to establish synchronization due to the uncertainty of a synchronization destination. This leads to a problem that communication in good communication conditions cannot be performed.

PRIOR ART DOCUMENT

Patent Document

Patent Document 1: Japanese Patent Application Publication No. 2010-56711

SUMMARY OF THE INVENTION

An aspect of a radio relay apparatus of the present invention is summarized as a radio relay apparatus (a radio relay apparatus 100) used in a radio communication system in which a radio base station (a radio base stations 200) transmits a first synchronization signal (a base station preamble signal) at a predetermined timing (e.g., a head timing of the down link period), the first synchronization signal being a radio signal to be used by a radio terminal to establish synchronization, comprising: a first radio communication unit (a donor-side radio communication unit 120D) that performs radio communications with the radio base station; a second radio communication unit (a service-side radio communication unit 120S) that performs radio communications with the radio terminal; and a control unit (a controller 130) that controls the first radio communication unit and the second radio communication unit, wherein the second radio communication unit transmits a second synchronization signal (a base station preamble signal) at a timing different from the predetermined timing, the second synchronization signal being a radio signal to be used by the radio terminal to establish synchronization, and the control unit controls the second radio communication unit so that at the predetermined timing, the second radio communication unit transmits a disturbing signal (a preamble mask signal) that is a radio signal to disturb the first synchronization signal.

According to the aspect described above, the radio relay apparatus transmits the disturbing signal at the timing (predetermined timing) when the radio base station transmits the first synchronization signal, thereby disturbing the reception of the first synchronization signal by the radio terminal located near the radio relay apparatus. This can solve the problem that the radio terminal located near the radio relay apparatus is connected to the radio base station or cannot establish synchronization due to the uncertainty of a synchronization destination.

Moreover, the radio relay apparatus transmits the second synchronization signal at a timing different from the timing (predetermined timing) when the radio base station transmits the first synchronization signal. Thus, the radio terminal located near the radio relay apparatus can successfully receive the second synchronization signal, and is connected to the radio relay apparatus by establishing synchronization with the radio relay apparatus. This can increase the probability that the radio terminal located near the radio relay apparatus is connected to the radio relay apparatus.

Another aspect of a radio relay apparatus of the present invention is summarized as, in the radio relay apparatus of the above aspect, the first radio communication unit receives a radio signal from the radio base station in a specific period (a downlink period t1) including the predetermined timing, and the control unit controls the second radio communication unit so that the second radio communication unit transmits the disturbing signal with transmission power limited in consideration of interference with the first radio communication unit.

Another aspect of a radio relay apparatus of the present invention is summarized as, in the radio relay apparatus of the above aspect, the control unit controls the transmission power of the disturbing signal based on frequency spacing between a communication frequency band set for the second radio communication unit and a communication frequency band set for the first radio communication unit.

Another aspect of a radio relay apparatus of the present invention is summarized as, in the radio relay apparatus of the above aspect, when the frequency spacing exceeds a predetermined spacing, the control unit performs control to make the transmission power of the disturbing signal larger than in the condition where the frequency spacing is the predetermined spacing.

Another aspect of a radio relay apparatus of the present invention is summarized as, in the radio relay apparatus of the above aspect, the control unit controls the transmission power of the disturbing signal based on a radio quality level of the radio signal received by the first radio communication unit.

Another aspect of a radio relay apparatus of the present invention is summarized as, in the radio relay apparatus of the above aspect, when the radio quality level is lower than a predetermined level, the control unit performs control to make the transmission power of the disturbing signal smaller than in the condition where the radio quality level is not lower than the predetermined level.

Another aspect of a radio relay apparatus of the present invention is summarized as, in the radio relay apparatus of the above aspect, the control unit sets a communication frequency band for the first radio communication unit, the communication frequency band having the highest radio quality level measured for the first radio communication unit, among a plurality of communication frequency bands usable by the radio relay apparatus.

Another aspect of a radio relay apparatus of the present invention is summarized as, in the radio relay apparatus of the above aspect, the control unit sets a communication frequency band for the second radio communication unit, the communication frequency band having the lowest radio quality level measured for the first radio communication unit, among the plurality of communication frequency bands.

An aspect of a method for controlling of the present invention is summarized as, in the radio relay apparatus of the above aspect, a method for controlling a radio relay apparatus used in a radio communication system in which a radio base station transmits a first synchronization signal at a predetermined timing, the first synchronization signal being a radio signal to be used by a radio terminal to establish synchronization, the radio relay apparatus including a first radio communication unit that performs radio communications with the radio base station, and a second radio communication unit that performs radio communications with the radio terminal, the method comprising the steps of: transmitting a second synchronization signal by the second radio communication unit at a timing different from the predetermined timing, the second synchronization signal being a radio signal to be used by the radio terminal to establish synchronization; and transmitting a disturbing signal by the second radio communication unit at the predetermined timing, the disturbing signal being a radio signal to disturb the first synchronization signal.

BRIEF DESCRIPTION OF THE DRAWINGS

FIG. 6 is a schematic perspective view showing an implementation example of the radio relay apparatus according to the embodiment of the present invention.

FIG. 9 is a flowchart showing an operation flow of the radio relay apparatus according to the embodiment of the present invention.

FIG. 10 is a diagram showing an example of a transmission power table according to the embodiment of the present invention.

DESCRIPTION OF THE EMBODIMENT

Figure 1:
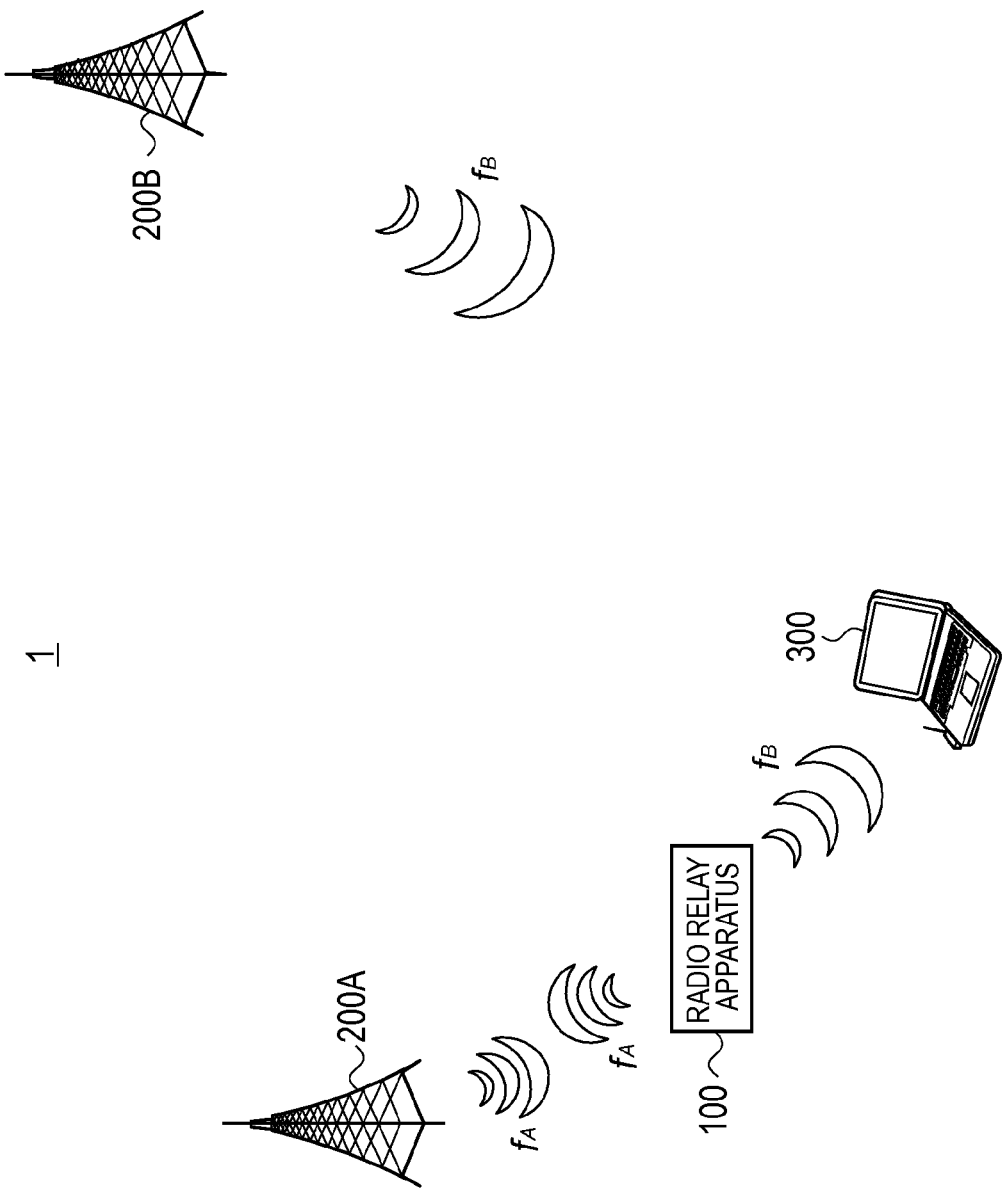
FIG. 1 is a schematic configuration diagram of a radio communication system according to an embodiment of the present invention.

With reference to the drawings, an embodiment of the present invention is described. To be more specific, description is given of (1) Overview of Radio Communication System, (2) Configuration of Radio Relay Apparatus, (3) Operations of Radio Relay Apparatus, (4) Advantageous Effects, and (5) Other Embodiments. In the following description of the drawings, same or similar reference numerals denote same or similar elements and portions.

(1) Overview of Radio Communication System

First, the overview of a radio communication system according to this embodiment is described in the order of (1.1) Overall Schematic Configuration, (1.2) Configuration of Communication Frame, and (1.3) Configuration of Communication Frequency Band.

(1.1) Overall Schematic Configuration

FIG. 1 is a schematic configuration diagram of a radio communication system 1 according to this embodiment. The radio communication system 1 has a configuration based on WiMAX (IEEE802.16). Specifically, the radio communication system 1 adopts an orthogonal frequency division multiple access (OFDMA) scheme and a time division duplexing (TDD) scheme.

The OFDMA scheme realizes multiple accesses by using multiple subcarriers orthogonal to each other. The TDD scheme realizes bidirectional communication by performing uplink communication and downlink communication in a time-divided manner in one communication frame. Here, "uplink" means a communication direction from the radio terminal to the radio base station, and "downlink" means a communication direction from the radio base station to the radio terminal.

In the radio communication system 1, downlink communication is first performed and then uplink communication is performed in one communication frame. Hereinafter, a period for performing downlink communication within one communication frame is referred to as a downlink period, while a period for performing uplink communication within one communication frame is referred to as an uplink period.

As shown in FIG. 1, the radio communication system 1 includes a radio relay apparatus 100, a radio base station 200 (radio base stations 200A and 200B), and a radio terminal 300.

The radio base stations 200A and 200B are macro-cell base stations to form a large cell. The radio base stations 200A and 200B operate in synchronization with each other. The radio relay apparatus 100 is connected to the radio base station 200A.

The radio terminal 300 is not connected to the radio base stations 200A and 200B or the radio relay apparatus 100. In this embodiment, it is assumed that the radio terminal 300 is located in a position near the radio relay apparatus 100.

Once connected to the radio relay apparatus 100, the radio terminal 300 communicates with the radio base station 200A through the radio relay apparatus 100. The radio terminal 300 communicates directly with the radio base station 200A or 200B when connected thereto.

The radio relay apparatus 100 uses a communication frequency band $f_A$ for radio communication with the radio base station 200A, and uses a communication frequency band $f_B$ for radio communication with the radio terminal 300. The radio base station 200B uses the communication frequency band $f_B$ for radio communication with the radio terminal 300.

The radio base stations 200A and 200B and the radio relay apparatus 100 periodically transmit preamble signals (synchronization signals) which are radio signals used by the radio terminal 300 to establish synchronization. Each of the preamble signals includes leading 1 OFDM symbols of the downlink period. Hereinafter, each of the preamble signals transmitted by the radio base stations 200A and 200B is referred to as the "base station preamble signal (first synchronization signal)", and the preamble signal transmitted by the radio relay apparatus 100 is referred to as the "relay station preamble signal (second synchronization signal)".

The radio terminal 300 searches for a preamble signal when starting radio communication, and when having received the preamble signal successfully, is connected to the source of the synchronization signal by establishing synchronization with the source of the preamble signal.

The radio relay apparatus 100 is configured to shift the period for transmitting the radio signal to the radio terminal 300 from the downlink period to the uplink period, and to shift the period for receiving the radio signal from the radio terminal 300 from the uplink period to the downlink period (see Patent Document 1). Such a method is hereinafter referred to as the "service-side transmission/reception shift method".

The radio base station 200A uses the communication frequency band $f_A$ to transmit the base station preamble signal in the downlink period. The radio base station 200B uses the communication frequency band $f_B$ to transmit the base station preamble signal in the downlink period. The radio relay apparatus 100 uses the communication frequency band $f_B$ to transmit the relay station preamble signal in the uplink period.

Figure 2:
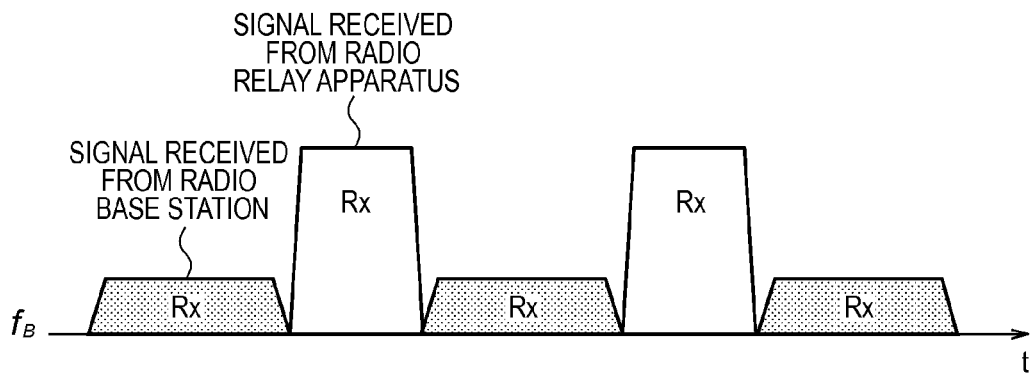
FIG. 2 is a time chart showing the state of a radio signal received by a radio terminal when a service-side transmission/reception shift method is used.

FIG. 2 is a time chart showing the state of the radio signal received by the radio terminal 300 when the service-side transmission/reception shift method is used.

As shown in FIG. 2, the radio terminal 300 receives the base station preamble signal and relay apparatus preamble signal using the same communication frequency band $f_B$ in the downlink period and uplink period. The radio terminal 300 located near the radio relay apparatus 100 can perform radio communication in good communication conditions by connecting to the radio relay apparatus 100. However, when the base station preamble signal using the same communication frequency band $f_B$ as that of the relay apparatus preamble signal is received at a different timing, there arises a problem that the radio terminal 300 is connected to the radio base station 200B or cannot establish synchronization due to the uncertainty of a synchronization destination.

To solve this problem, the radio relay apparatus 100 transmits a preamble mask signal (disturbing signal) that is a radio signal to disturb the base station preamble signal at the timing for the radio base station 200B to transmit the base station preamble signal (i.e., a timing corresponding to the leading 1 OFDM symbols in the downlink period), thereby causing interference with the base station preamble signal. As the preamble mask signal, a pilot signal composed of an existing signal sequence can be used, for example. The communication frequency band $f_B$ is used to transmit the preamble mask signal.

Simultaneously receiving the base station preamble signal and the preamble mask signal makes the radio terminal 300 unable to detect the base station preamble signal from the radio base station 200B. This, as a result, can solve the problem that the radio terminal 300 located near the radio relay apparatus 100 is connected to the radio base station 200B or cannot establish synchronization due to the uncertainty of a synchronization destination.

(1.2) Configuration of Communication Frame

Figure 3:
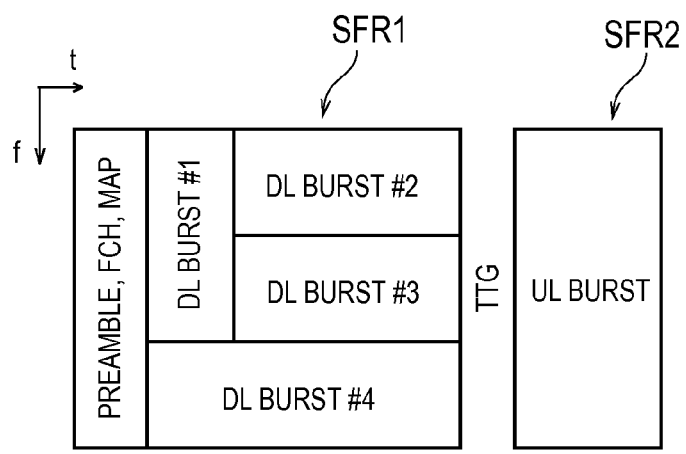
FIG. 3 is a communication frame configuration diagram showing a configuration of a communication frame used in the radio communication system according to the embodiment of the present invention.

FIG. 3 is a communication frame configuration diagram showing a configuration of a communication frame used in the radio communication system 1.

As shown in FIG. 3, the communication frame includes a downlink subframe SFR1 corresponding to the downlink period and an uplink subframe SFR2 corresponding to the uplink period. Since the downlink requires a larger communication capacity than the uplink, an uplink/downlink asymmetric frame configuration is employed, in which the downlink subframe SFR1 is longer than the uplink subframe SFR2. The downlink subframe SFR1 and the uplink subframe SFR2 are each composed of multiple symbols.

The head of the downlink subframe SFR1 is a control data region in which various control data are disposed, and the rest thereof is a burst region in which user data is disposed.

The control data includes the preamble described above, an FCH (header information transmitted from the radio base station) and a MAP that is resource allocation information about uplink and downlink user data.

A guard time (TTG) is provided between the downlink subframe SFR1 and the uplink subframe SFR2.

(1.3) Configuration of Communication Frequency Band

Figure 4:
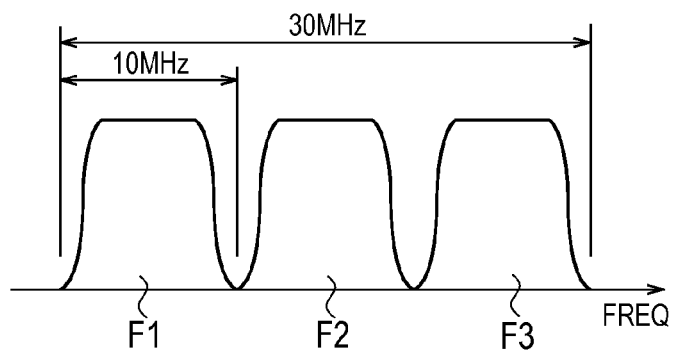
FIG. 4 is a diagram showing a configuration of a communication frequency band that can be used in the radio communication system according to the embodiment of the present invention.

FIG. 4 is a diagram showing a configuration of a communication frequency band that can be used in the radio communication system 1.

As shown in FIG. 4, the radio communication system 1 can use a system communication frequency band of 30 MHz, for example. The system communication frequency band is equally divided into three communication frequency bands F1 to F3.

Any of the communication frequency bands F1 to F3 corresponds to the communication frequency band $f_A$ described above. Any of the rest of the communication frequency bands corresponds to the communication frequency band $f_B$ described above.

Upon connection to the radio base station 200A, the radio relay apparatus 100 sets any of the communication frequency bands F1 to F3 as the communication frequency band to be used for radio communication with the radio base station 200A. Also, the radio relay apparatus 100 sets any of the rest of the communication frequency bands as the communication frequency band to be used for radio communication with the radio terminal.

(2) Configuration of Radio Relay Apparatus

Next, a configuration of the radio relay apparatus 100 is described in the order of (2.1) Functional Block Diagram and (2.2) Implementation Example.

(2.1) Functional Block Diagram

Figure 5:
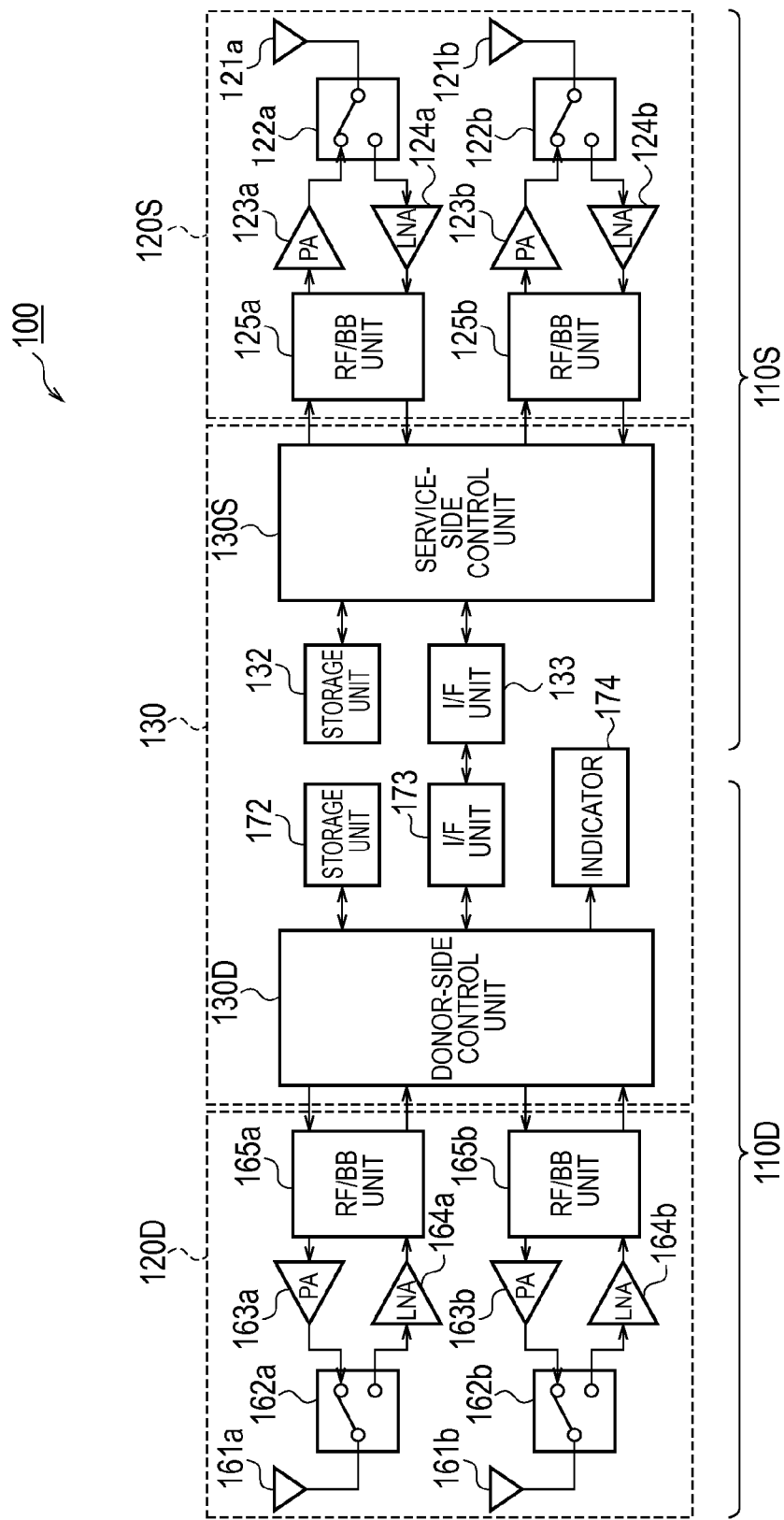
FIG. 5 is a block diagram showing a functional block configuration of a radio relay apparatus according to the embodiment of the present invention.

FIG. 5 is a block diagram showing a functional block configuration of the radio relay apparatus 100.

As shown in FIG. 5, the radio relay apparatus 100 includes a donor-side communication unit 110D to communicate with the radio base station 200 and a service-side communication unit 110S to communicate with the radio terminal 300.

The donor-side communication unit 110D has a communication function equivalent to that of the radio terminal, whereas the service-side communication unit 110S has a communication function equivalent to that of the radio base station. The donor-side communication unit 110D and the service-side communication unit 110S are wired through Ethernet (registered trademark) or the like.

The donor-side communication unit 110D includes a donor-side radio communication unit 120D, a donor-side control unit 130D, a storage unit 172, an interface (I/F) unit 173, and an indicator 174. In this embodiment, the donor-side radio communication unit 120D corresponds to a first radio communication unit.

The donor-side radio communication unit 120D is configured to perform radio communication with the radio base station 200 using the OFDMA and TDD schemes. The donor-side radio communication unit 120D receives a radio signal from the radio base station 200 in the downlink period.

The donor-side radio communication unit 120D includes donor antennas 161a and 161b, transmission/reception changeover switches 162a and 162b, power amplifiers (PAs) 163a and 163b, low-noise amplifiers (LNAs) 164a and 164b, and radio frequency/baseband (RF/BB) units 165a and 165b. In this way, this embodiment achieves a diversity effect by providing two transmission/reception systems in the donor-side radio communication unit 120D.

The donor-side control unit 130D is formed of a CPU, for example, and controls various functions included in the donor-side communication unit 110D. The donor-side control unit 130D has a function to measure an RSSI (Received Signal Strength Indicator) indicating a received power level of a radio signal received by the donor-side radio communication unit 120D and an SNR (Signal to Noise Ratio) indicating radio quality of the radio signal received by the donor-side radio communication unit 120D.

The storage unit 172 is formed of a memory, for example, and stores therein various information used for control and the like in the donor-side communication unit 110D. The I/F unit 173 is connected to the service-side communication unit 110S. The indicator 174 is controlled by the donor-side control unit 130D to display information indicating the received power level from the radio base station 200.

The service-side communication unit 110S includes a service-side radio communication unit 120S, a service-side control unit 130S, a storage unit 132, and an I/F unit 133. In this embodiment, the service-side radio communication unit 120S corresponds to a second radio communication unit.

The service-side radio communication unit 120S is configured to perform radio communication with the radio terminal 300 using the OFDMA and TDD schemes. The service-side radio communication unit 120S transmits the relay apparatus preamble signal described above.

The service-side radio communication unit 120S includes service antennas 121a and 121b, transmission/reception changeover switches 122a and 122b, PAs 123a and 123b, LNAs 124a and 124b, and RF/BB units 125a and 125b. In this way, this embodiment achieves a diversity effect by providing two transmission/reception systems in the service-side radio communication unit 120S.

The service-side control unit 130S is formed of a CPU, for example, and controls various functions included in the service-side communication unit 110S. The storage unit 132 is formed of a memory, for example, and stores therein various information used for control and the like in the service-side communication unit 110S. The I/F unit 133 is connected to the donor-side communication unit 110D.

In this embodiment, the donor-side control unit 130D, the service-side control unit 130S, the storage units 172 and 132, the I/F units 173 and 133, and the indicator 174 make up a controller configured to control the donor-side radio communication unit 120D and the service-side radio communication unit 120S.

Among the communication frequency bands that can be used by the radio relay apparatus 100, the controller 130 sets, for the donor-side radio communication unit 120D, the communication frequency band having the highest SNR (radio quality) measured for the donor-side radio communication unit 120D. On the other hand, the controller 130 sets, for the service-side radio communication unit 120S, the communication frequency band having the lowest SNR measured for the service-side radio communication unit 120S.

The controller 130 controls the service-side radio communication unit 120S to transmit the preamble mask signal at a transmission timing of the base station preamble signal (i.e., a head timing of the downlink period).

The controller 130 controls the service-side radio communication unit 120S to transmit the preamble mask signal with a transmission power limited in consideration of interference with the donor-side radio communication unit 120D. For example, the transmission power for the preamble mask signal is controlled to be smaller than that used when the service-side radio communication unit 120S transmits the user data (see FIG. 8 (c)).

Moreover, the controller 130 controls the transmission power for the preamble mask signal according to the frequency spacing between the communication frequency band set for the service-side radio communication unit 120S and the communication frequency band set for the donor-side radio communication unit 120D.

Furthermore, the controller 130 controls the transmission power for the preamble mask signal according to the RSSI (received power level) of the radio signal received by the donor-side radio communication unit 120D from the radio base station 200. The control of the transmission power for the preamble mask signal according to the RSSI of the radio signal may be executed during a relay operation performed by the radio relay apparatus 100 in consideration of a change in radio environment.

(2.2) Implementation Example

FIG. 6 is a schematic perspective view showing an implementation example of the radio relay apparatus 100.

As shown in FIGS. 6 (*a*) and 6 (*b*), arranged in a case 105 of the radio relay apparatus 100 are: a board 101 in which the donor-side communication unit 110D is implemented; a board 103 in which the service-side communication unit 110S is implemented; and a board 102 in which a mechanism for relay between the donor-side communication unit 110D and the service-side communication unit 110S is implemented.

The donor antennas 161*a* and 161*b* extend from the board 101 to the outside of the case 105. The service antennas 121*a* and 121*b* are arranged on the board 103. In this way, in the radio relay apparatus 100, the donor antennas 161*a* and 161*b* and the service antennas 121*a* and 121*b* are arranged next to each other with no radio wave shielding plate provided therebetween. Note that the donor antennas 161*a* and 161*b* may be arranged on the board 101 in the same manner as the service antennas 121*a* and 121*b*.

(3) Operations of Radio Relay Apparatus

Next, operations of the radio relay apparatus 100 are described in the order of (3.1) Schematic Operations, (3.2) Detailed Operations, and (3.3) Operation Flow.

(3.1) Schematic Operations

Figure 7:
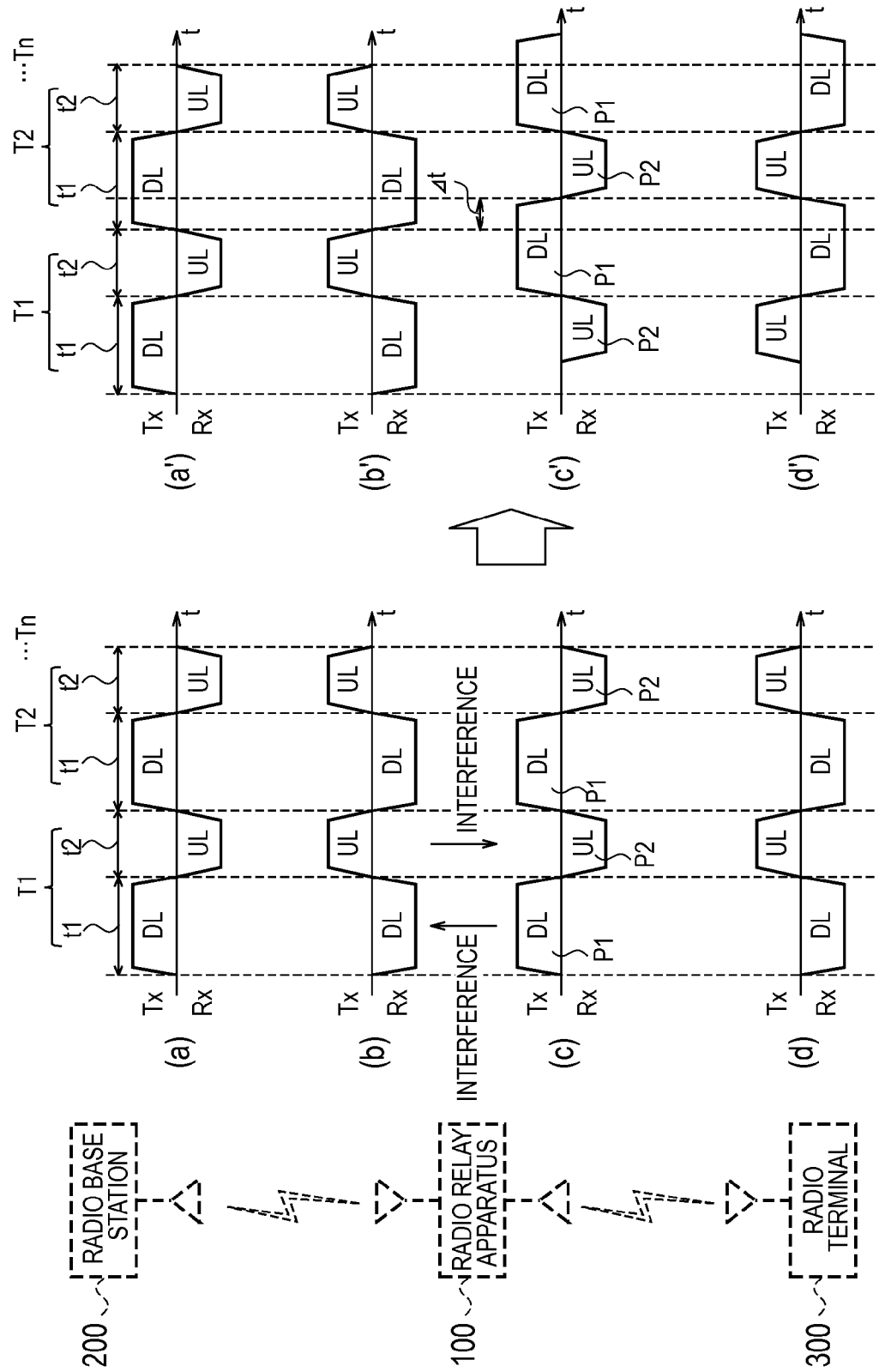
FIG. 7 is a time chart for explaining schematic operations of the radio relay apparatus according to the embodiment of the present invention.

FIG. 7 is a time chart for explaining schematic operations of the radio relay apparatus 100.

FIGS. 7 (*a*) to 7 (*d*) show how the radio base station 200, the radio relay apparatus 100, and the radio terminal 300 communicate with each other without complying with the service-side transmission/reception shift method. FIGS. 7 (*a'*) to 7 (*d'*) show how the radio base station 200, the radio relay apparatus 100, and the radio terminal 300 communicate with each other in accordance with the service-side transmission/reception shift method.

Note that FIGS. 7 (*a*) and 7 (*a'*) show the operation of the radio base station 200, FIGS. 7 (*b*) and 7 (*b'*) show the operation of the donor-side radio communication unit 120D of the radio relay apparatus 100, FIGS. 7 (*c*) and 7 (*c'*) show the operation of the service-side radio communication unit 120S of the radio relay apparatus 100, and FIGS. 7 (*d*) and 7 (*d'*) show the operation of the radio terminal 300.

As shown in FIGS. 7 (*a*) to 7 (*d*), a downlink period t1 and an uplink period t2 are provided in a time-divided manner, in each communication frame period Tn. As shown in FIG. 7 (*b*), the donor-side radio communication unit 120D of the radio relay apparatus 100 receives a radio signal from the radio base station 200 in the downlink period t1, and transmits a radio signal to the radio base station 200 in the uplink period t2.

According to the method not complying with the service-side transmission/reception shift method, as shown in FIG. 7 (*c*), the service-side radio communication unit 120S of the radio relay apparatus 100 transmits a radio signal to the radio terminal 300 in the downlink period t1, and receives a radio signal from the radio terminal 300 in the uplink period t2. For this reason, the service-side radio communication unit 120S interferes with the donor-side radio communication unit 120D in the downlink period t1, and the donor-side radio communication unit 120D interferes with the service-side radio communication unit 120S in the uplink period t2.

According to the service-side transmission/reception shift method, on the other hand, as shown in FIG. 7 (*c'*), the service-side control unit 130S of the service-side communication unit 110S sets a service-side transmission period P1, during which the service-side radio communication unit 120S transmits radio signals to the radio terminal 300, in the uplink period t2. Moreover, the service-side control unit 130S sets a service-side reception period P2, during which the service-side radio communication unit 120S receives radio signals from the radio terminal 300, in the downlink period t1.

For example, as shown in FIGS. 7 (*a'*) to 7 (*d'*), the radio relay apparatus 100 transmits radio signals received from the radio terminal 300 in the downlink period t1 of the communication frame period T1, to the radio base station 200 in the uplink period t2 of the communication frame period T1. Furthermore, the radio relay apparatus 100 transmits radio signals received from the radio base station 200 in the downlink period t1 of the communication frame period T1, to the radio terminal 300 in the uplink period t2 of the communication frame period T1. Thus, the interference described above is avoided.

The time length of the downlink period t1 is longer than the time length of the uplink period t2. For this reason, since the service-side control unit 130S sets the service-side transmission period P1 in the uplink period t2, the service-side transmission period P1 partly extends beyond the uplink period t2 to overlap a part of the downlink period t1. Hereinafter, the part of the service-side transmission period P1 that overlaps the downlink period t1 is called an overlap portion Δt.

(3.2) Detailed Operations

Figure 8:
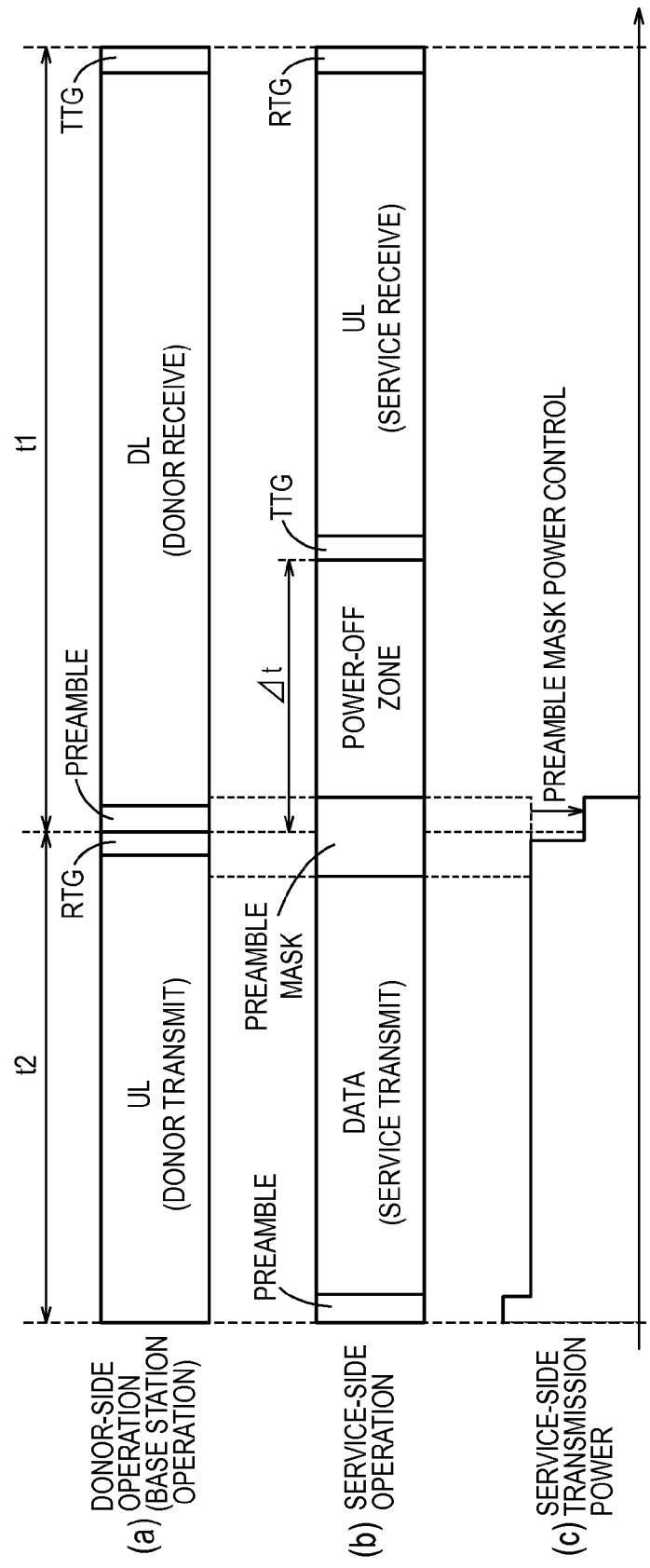
FIG. 8 is a time chart for explaining detailed operations of the radio relay apparatus according to the embodiment of the present invention.

FIG. 8 is a time chart for explaining detailed operations of the radio relay apparatus 100.

As shown in FIGS. 8 (*a*) and 8 (*b*), the service-side control unit 130S stops transmission to the radio terminal 300 from the service-side radio communication unit 120S in a period of the overlap portion Δt that does not include the preamble signal transmission timing in the downlink period t1. Thus, in the overlap portion Δt, the service-side radio communication unit 120S no longer interferes with the donor-side radio communication unit 120D.

Although no data is transmitted in the transmission stop period, such data can be transmitted to the radio terminal 300 by using a mechanism such as retransmission control. In the overlap portion Δt, it is preferable to place data whose communication delay is allowable, and not to place data, such as audio data, for which high real-time performance and quality of service (QoS) are required.

As shown in FIG. 8 (*c*), the service-side control unit 130S controls the service-side radio communication unit 120S to transmit the preamble mask signal (pilot signal) at the preamble signal transmission timing of the downlink period t1 in the overlap portion Δt. To be more specific, the service-side control unit 130S continues transmission of the pilot signals while stopping the transmission of the user data from the service-side radio communication unit 120S.

Since the preamble mask signal leads to interference with the donor-side radio communication unit 120D, the donor-side control unit 130D and the service-side control unit 130S set the transmission power for the preamble mask signal so that the degree of the interference with the donor-side radio communication unit 120D is within the allowable range. Thus, no mechanism (shielding plate or the like) against the interference needs to be provided in the case, and the donor-side communication unit 110D and the service-side communication unit 110S can be housed in a smaller case.

Considering the influence of interference with the donor-side radio communication unit 120D from the service-side radio communication unit 120S, the degree of interference varies depending on the relationship (spacing) between the service transmission frequency and the donor reception frequency. To be more specific, the degree of interference varies between the case where the service transmission frequency and the donor reception frequency are adjacent to each other and the case where the frequencies are spaced in a second adjacent or farther apart relationship. For this reason, the donor-side control unit 130D and the service-side control unit 130S control the transmission power for the preamble mask signal in accordance with such a frequency relationship.

Moreover, the degree (rate) of interference with the donor-side control unit 130D from the service-side radio communication unit 120S varies depending on the state of the radio signal the donor-side radio communication unit 120D receives from the radio base station 200. Accordingly, the donor-side control unit 130D and the service-side control unit 130S control the transmission power for the preamble mask signal in accordance with the RSSI in the donor-side radio communication unit 120D.

(3.3) Operation Flow

FIG. 9 is a flowchart showing an operation flow of the radio relay apparatus 100. This operation flow is executed when the radio relay apparatus 100 is connected to the radio base station 200A, and can also be periodically executed after the radio relay apparatus 100 is connected to the radio base station 200A.

In Step S11, the donor-side control unit 130D measures the SNR of the radio signal received by the donor-side radio communication unit 120D for each of the communication frequency bands F1 to F3 (see FIG. 3).

In Step S12, the donor-side control unit 130D sets, for the donor-side radio communication unit 120D, the communication frequency band having the highest SNR among the communication frequency bands F1 to F3. Also, the donor-side control unit 130D notifies the service-side control unit 130S of the communication frequency band having the lowest SNR among the communication frequency bands F1 to F3. The service-side control unit 130S sets, for the service-side radio communication unit 120S, the communication frequency band having the lowest SNR among the communication frequency bands F1 to F3.

In Step S13, the donor-side control unit 130D measures the RSSI of the radio signal received from the radio base station 200A in the communication frequency band set for the donor-side radio communication unit 120D.

In Step S14, the donor-side control unit 130D determines the transmission power for the preamble mask signal based on the frequency spacing between the communication frequency bands set in Step S12 and the RSSI measured in Step S13.

In this embodiment, the storage unit 172 previously stores a transmission power table as shown in FIG. 10. The donor-side control unit 130D acquires the transmission power corresponding to the frequency spacing and the RSSI from the transmission power table stored in the storage unit 172.

As shown in FIG. 10, the transmission power table is divided into two columns: "adjacent" (e.g., the relationship between F1 and F2 shown in FIG. 4) where the frequency spacing is approximately zero, and "second adjacent or farther apart" (e.g., the relationship between F1 and F3 shown in FIG. 4) where the frequency spacing is one communication frequency band or more. Also, the columns "adjacent" and "second adjacent or farther apart" are each divided into rows indicating different RSSI ranges.

In "adjacent", the transmission power of the preamble mask signal is −14 [dB] when the RSSI is larger than −90 and not more than −80, the transmission power of the preamble mask signal is −11 [dB] when the RSSI is larger than −80 and not more than −70, the transmission power of the preamble mask signal is −8 [dB] when the RSSI is larger than −70 and not more than −60, and the transmission power of the preamble mask signal is −5 [dB] when the RSSI is larger than −60.

In "second adjacent or farther apart", the transmission power of the preamble mask signal is −9 [dB] when the RSSI is larger than −90 and not more than −80, the transmission power of the preamble mask signal is −6 [dB] when the RSSI is larger than −80 and not more than −70, the transmission power of the preamble mask signal is −3 [dB] when the RSSI is larger than −70 and not more than −60, and the transmission power of the preamble mask signal is 0 [dB] when the RSSI is larger than −60.

As described above, in the transmission power table, the transmission power of the preamble mask signal is set larger for "second adjacent or farther apart" compared with "adjacent". Moreover, the higher the RSSI, the larger the transmission power of the preamble mask signal is set.

The donor-side control unit 130D notifies the service-side control unit 130S of the determined transmission power of the preamble mask signal. The service-side control unit 130S sets the notified transmission power of the preamble mask signal for the service-side radio communication unit 120S.

(4) Advantageous Effects

As described above, the radio relay apparatus 100 transmits the preamble mask signal at the timing when the radio base station 200 transmits the base station preamble signal, thereby disturbing the reception of the base station preamble signal by the radio terminal 300 located near the radio relay apparatus 100. This, as a result, can solve the problem that the radio terminal 300 located near the radio relay apparatus 100 is connected to the radio base station 200 or cannot establish synchronization cannot due to the uncertainty of a synchronization destination.

The radio relay apparatus 100 transmits the relay apparatus preamble signal at a timing different from the timing when the radio base station 200 transmits the base station preamble signal. Thus, the radio terminal 300 located near the radio relay apparatus 100 can successfully receive the relay apparatus preamble signal and is connected to the radio relay apparatus 100 while establishing synchronization with the radio relay apparatus 100. This can increase the probability that the radio terminal 300 located near the radio relay apparatus 100 is connected to the radio relay apparatus 100.

In this embodiment, the controller 130 controls the service-side radio communication unit 120S to transmit the preamble mask signal with the transmission power limited in consideration of the interference with the donor-side radio communication unit 120D. This can reduce the influence of interference the preamble mask signal has on the donor-side radio communication unit 120D.

In this embodiment, the controller 130 controls the transmission power of the preamble mask signal based on the frequency spacing between the communication frequency band set for the service-side radio communication unit 120S and the communication frequency band set for the donor-side radio communication unit 120D.

If the frequency spacing is wide, the influence of interference the preamble mask signal has on the donor-side radio communication unit 120D is small. Thus, the base station preamble signal can be more surely disturbed by increasing the transmission power of the preamble mask signal.

On the other hand, if the frequency spacing is narrow, the influence of interference the preamble mask signal has on the donor-side radio communication unit 120D is large. Thus, the influence of interference the preamble mask signal has on the donor-side radio communication unit 120D can be reduced by reducing the transmission power of the preamble mask signal.

In this embodiment, the controller 130 controls the transmission power of the preamble mask signal based on the RSSI of the radio signal the donor-side radio communication unit 120D receives from the radio base station 200.

If the RSSI is large, the influence of interference the preamble mask signal has on the donor-side radio communication unit 120D is relatively reduced. Thus, the base station preamble signal can be more surely disturbed by increasing the transmission power of the preamble mask signal.

On the other hand, if the RSSI is small, the influence of interference the preamble mask signal has on the donor-side radio communication unit 120D is relatively increased. Thus, the influence of interference the preamble mask signal has on the donor-side radio communication unit 120D can be reduced by reducing the transmission power of the preamble mask signal.

In this embodiment, the controller 130 sets, for the donor-side radio communication unit 120D, the communication frequency band having the highest SNR measured for the donor-side radio communication unit 120D, among the communication frequency bands that can be used by the radio relay apparatus 100. Thus, the influence of interference the preamble mask signal has on the donor-side radio communication unit 120D can be relatively reduced.

In this embodiment, the controller 130 sets, for the service-side radio communication unit 120S, the communication frequency band having the lowest SNR measured for the donor-side radio communication unit 120D, among the communication frequency bands that can be used by the radio relay apparatus 100. Accordingly, the communication frequency band having a good SNR can be secured for the case of switching the communication frequency band set for the donor-side radio communication unit 120D. As a result, even after switching of the communication frequency band set for the donor-side radio communication unit 120D, the influence of interference the preamble mask signal has on the donor-side radio communication unit 120D can be relatively reduced.

(5) Other Embodiments

As described above, the present invention has been described by using the embodiment. However, it should not be understood that the description and drawings which constitute part of this disclosure limit the present invention. From this disclosure, various alternative embodiments, examples, and operation techniques will be easily found by those skilled in the art.

In the embodiment described above, the description has been given of the example where the transmission power of the preamble mask signal is controlled based on the frequency spacing between the communication frequency band set for the service-side radio communication unit 120S and the communication frequency band set for the donor-side radio communication unit 120D and the RSSI of the radio signal the donor-side radio communication unit 120D receives from the radio base station 200. However, the transmission power of the preamble mask signal may be controlled based on only one of the frequency spacing and the RSSI. Moreover, the present invention is not limited to the case where the transmission power of the preamble mask signal is changed as appropriate, but the transmission power of the preamble mask signal takes a preset fixed value. Furthermore, the transmission power of the preamble mask signal may be controlled using the SNR of the radio signal instead of the RSSI.

Note that, although the radio communication system 1 based on WiMAX (IEEE802.16) is described in the above embodiment, the radio communication system may be based on any standard other than WiMAX as long as the system employs the TDD scheme. For example, the present invention is also applicable to the 3GPP ($3^{rd}$ Generation Partner ship Project)-standardized LTE (Long Term Evolution) TDD mode, for example.

Further, the radio relay apparatus 100 is not limited to be of a fixed type, but may be of a mobile type mounted on a vehicle, for example.

As described above, it should be understood that the present invention includes various embodiments which are not described herein. Accordingly, the technical scope of the present invention should be determined only by the matters to define the invention in the scope of claims regarded as appropriate based on the description.

Note that the entire content of Japanese Patent Application No. 2010-151486 (filed on Jul. 1, 2010) is incorporated herein by reference.

INDUSTRIAL APPLICABILITY

The present invention can provide a radio relay apparatus and a control method capable of improving the probability that a radio terminal located near a radio relay apparatus is connected to the radio relay apparatus.

The invention claimed is:

1. A radio relay apparatus used in a radio communication system in which a radio base station transmits a first synchronization signal at a predetermined timing, the first synchronization signal being a radio signal to be used by a radio terminal to establish synchronization, comprising:
   a first radio communication unit that performs radio communications with the radio base station;
   a second radio communication unit that performs radio communications with the radio terminal; and
   a control unit that controls the first radio communication unit and the second radio communication unit,
   wherein the second radio communication unit transmits a second synchronization signal at a timing different from the predetermined timing, the second synchronization signal being a radio signal to be used by the radio terminal to establish synchronization, and
   the control unit controls the second radio communication unit so that at the predetermined timing, the second radio communication unit transmits a disturbing signal that is a radio signal to disturb the first synchronization signal.

2. The radio relay apparatus according to claim 1, wherein the first radio communication unit receives a radio signal from the radio base station in a specific period including the predetermined timing, and
   the control unit controls the second radio communication unit so that the second radio communication unit transmits the disturbing signal with transmission power limited in consideration of interference with the first radio communication unit.

3. The radio relay apparatus according to claim 2, wherein the control unit controls the transmission power of the disturbing signal based on frequency spacing between a communication frequency band set for the second radio communication unit and a communication frequency band set for the first radio communication unit.

4. The radio relay apparatus according to claim 3, wherein when the frequency spacing exceeds a predetermined spacing, the control unit performs control to make the transmission power of the disturbing signal larger than in a condition where the frequency spacing is the predetermined spacing.

5. The radio relay apparatus according to claim 2, wherein the control unit controls the transmission power of the disturbing signal based on a radio quality level of the radio signal received by the first radio communication unit.

6. The radio relay apparatus according to claim 5, wherein when the radio quality level is lower than a predetermined level, the control unit performs control to make the transmission power of the disturbing signal smaller than in a condition where the radio quality level is not lower than the predetermined level.

7. The radio relay apparatus according to claim 1, wherein the control unit sets a communication frequency band for the first radio communication unit, the communication frequency band having the highest radio quality level measured for the first radio communication unit, among a plurality of communication frequency bands usable by the radio relay apparatus.

8. The radio relay apparatus according to claim 7, wherein the control unit sets a communication frequency band for the second radio communication unit, the communication frequency band having the lowest radio quality level measured for the first radio communication unit, among the plurality of communication frequency bands.

9. A method for controlling a radio relay apparatus used in a radio communication system in which a radio base station transmits a first synchronization signal at a predetermined timing, the first synchronization signal being a radio signal to be used by a radio terminal to establish synchronization, the radio relay apparatus including
- a first radio communication unit that performs radio communications with the radio base station, and
- a second radio communication unit that performs radio communications with the radio terminal, the method comprising the steps of:
- transmitting a second synchronization signal by the second radio communication unit at a timing different from the predetermined timing, the second synchronization signal being a radio signal to be used by the radio terminal to establish synchronization; and
- transmitting a disturbing signal by the second radio communication unit at the predetermined timing, the disturbing signal being a radio signal to disturb the first synchronization signal.

* * * * *